(12) United States Patent
Dichtl

(10) Patent No.: US 8,531,247 B2
(45) Date of Patent: Sep. 10, 2013

(54) DEVICE AND METHOD FOR GENERATING A RANDOM BIT SEQUENCE

(75) Inventor: Markus Dichtl, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/937,735

(22) PCT Filed: Mar. 11, 2009

(86) PCT No.: PCT/EP2009/052851
§ 371 (c)(1),
(2), (4) Date: Oct. 14, 2010

(87) PCT Pub. No.: WO2009/127475
PCT Pub. Date: Oct. 22, 2009

(65) Prior Publication Data
US 2011/0032041 A1   Feb. 10, 2011

(30) Foreign Application Priority Data
Apr. 14, 2008  (DE) .......................... 10 2008 018 678

(51) Int. Cl.
*H03B 29/00* (2006.01)
*H03K 3/03* (2006.01)
*G06F 7/58* (2006.01)

(52) U.S. Cl.
USPC ................. 331/78; 331/57; 708/251

(58) Field of Classification Search
USPC ................ 331/57, 78; 708/251, 252, 255; 714/738, 739
See application file for complete search history.

(56) References Cited

U.S. PATENT DOCUMENTS

| 7,797,361 B2 | 9/2010 | Lazich et al. ................. 708/251 |
| 2004/0264233 A1 | 12/2004 | Fukushima et al. .......... 365/145 |
| 2005/0004960 A1 | 1/2005 | Hars ............................. 708/251 |
| 2005/0129247 A1* | 6/2005 | Gammel et al. ............. 380/286 |
| 2006/0069706 A1 | 3/2006 | Lazich et al. ................. 708/251 |
| 2006/0173943 A1 | 8/2006 | Luzzi et al. .................. 708/250 |
| 2007/0244950 A1* | 10/2007 | Golic .......................... 708/250 |

FOREIGN PATENT DOCUMENTS

| CN | 1782987 A | 6/2006 |
| DE | 10213269 | 10/2003 |
| DE | 10357782 | 5/2005 |
| EP | 1643643 | 4/2006 |
| JP | 64068668 | 3/1989 |
| JP | 7098995 A | 4/1995 |
| JP | 2005018251 A | 1/2005 |
| WO | 2006015624 | 2/2006 |
| WO | 2009/109959 A1 | 9/2009 |

OTHER PUBLICATIONS

European Office Action, European patent application No. 09732686. 2, 4 pages, Apr. 15, 2011.

(Continued)

*Primary Examiner* — Ryan Johnson
(74) *Attorney, Agent, or Firm* — King & Spalding L.L.P.

(57) ABSTRACT

A device (1) for generating a random bit sequence has a digital ring oscillator circuit (2) having at least one first feedback path (R8) and one second feedback path (R14). To this end, a changeover is performed between the feedback paths (R8, R14) at times which can be predetermined, and a random signal (OS) having a random level history can be tapped at an output node (4) of the ring oscillator circuit (2).

22 Claims, 7 Drawing Sheets

(56) References Cited

OTHER PUBLICATIONS

International Search Report and Written Opinion for Application No. PCT/EP2009/052851 (14 pages), Jun. 26, 2009.
Brar et al., "True Random Number Generators", Course Cryptography and Computer Network-Security ECE646, Fall 2007, George Mason University, Department of Electrical and Computer Engineering (5 pages), Dec. 19, 2007.
Japanese Office Action, Japan Patent Application No. 2011-504396, 8 pages, Jul. 18, 2012.

* cited by examiner

DEVICE AND METHOD FOR GENERATING A RANDOM BIT SEQUENCE

CROSS-REFERENCE TO RELATED APPLICATIONS

This application is a U.S. National Stage Application of International Application No. PCT/EP2009/052851 filed Mar. 11, 2009, which designates the United States of America, and claims priority to DE Application No. 10 2008 018 678.3 filed Apr. 14, 2008. The contents of which are hereby incorporated by reference in their entirety.

TECHNICAL FIELD

The present invention relates to devices and methods for generating random bits and random bit sequences. This is typically used for implementing a random number generator.

BACKGROUND

Random numbers, which occur in digital form as random bit sequences, are frequently needed in security-relevant applications. It is necessary to generate and use random numbers in asymmetrical authentication methods for example. In particular for RFID tags with security functionality the corresponding random numbers are to be generated with especially low hardware outlay. It is desirable in such cases only to use digital logic circuits which can be implemented with little effort.

In the past random number generators have typically been employed by using of analog noise sources of which the signals are digitized. Hybrid analog/digital circuits are expensive to implement however.

A random number generator almost entirely featuring digital logic circuits is described in WO 2006/015624 A1. This international patent application proposes the use of random phase fluctuations from ring oscillators constructed from digital gates. In accordance with WO 2006/015624 A1 however only very specific ring oscillators, namely Fibonacci or Galois ring oscillators with particular properties, are suitable for use in a random number generator. A circuit constructed in this manner is based on the assumption that the ring oscillators may not have any fixed points. For Fibonacci or Galois ring oscillators in particular this condition can be represented by mathematical equations, which must be fulfilled according to WO 2006/015624 A1. For a corresponding implementation it is thus first necessary to test whether a ring oscillator has fixed points. It is thus disadvantageous that the choice of oscillators to be considered is very restricted.

SUMMARY

According to various embodiments, an improved device for generating random bits can be created.

According to an embodiment, a device for generating a random bit sequence with a digital ring oscillator circuit, may have at least one first feedback path and a second feedback path, and may be designed such that at predeterminable times a switchover occurs between the feedback paths, wherein a random signal with a random level history can be tapped at an output node of the ring oscillator circuit.

According to a further embodiment, a switching device can be provided which performs a switchover of the feedback path at predetermined times. According to a further embodiment, the switching device may switch between the feedback paths as a function of a switching signal. According to a further embodiment, a switchover may take place periodically. According to a further embodiment, the ring oscillator circuit may also have an input node and may be designed such that an oscillation takes place when there is a change of state of a logical start signal coupled to the input node. According to a further embodiment, the ring oscillator circuit may feature a number of serially-connected logical components. According to a further embodiment, at least seven serially-connected logical components may be provided. According to a further embodiment, the logical components can be inverters. According to a further embodiment, the device may have a buffer element coupled to the output node, which stores a logical level as a function of the random signal. According to a further embodiment, the buffer element may store a logical level corresponding to the random signal as a function of a sampling signal. According to a further embodiment, the device may have a sample signal generation device which generates a change in the logical state of the sampling signal at predeterminable times. According to a further embodiment, the device may comprise a square-wave generation device coupled to the input node, which generates the start signal with changing logical levels. According to a further embodiment, the device may comprise a control device which, in accordance with programming, causes a random bit value to be tapped at the output node or buffer element and/or causes the start signal and/or the switching signal to be generated. According to a further embodiment, the ring oscillator circuit may be embodied in the form of a Galois ring oscillator or Fibonacci ring oscillator. According to a further embodiment, the device may be implemented as an FPGA circuit.

According to another embodiment, an RFID chip may comprise a device as described above and a cryptography device, with a number of random bits derived from the random signal being used by the cryptographic device for performing a cryptographic authentication, for generating a cryptographic signature and/or for creating a cryptographic key.

According to yet another embodiment, a random number generator may comprise a device as described above, with a number of level values of the random signal tapped at the output node or logical levels stored by a buffer element being sampled as bit values or a random number.

According to yet another embodiment, a digital ring oscillator circuit with at least a first feedback path and a second feedback path, with a respective feedback path being switched over a predeterminable number of times, with a random signal with a random level history able to be tapped at an output node of the ring oscillator circuit, can be used to generate at least one random bit.

According to yet another embodiment, in a method for generating a random bit sequence, depending on a level history of a random signal tapped at a digital ring oscillator circuit, random bit values are determined, with the digital ring oscillator circuit having at least one first feedback path and a second feedback path, and at predeterminable times a switchover taking place between the feedback paths, with a random signal with a random level history able to be tapped at an output node of the ring oscillator circuit.

According to a further embodiment of the above method, the following steps can be performed: —Activating a digital ring oscillator circuit; —Switching between the first and the second feedback path; —Tapping one or more level values of an oscillating random signal generated by the ring oscillator circuit. According to a further embodiment of the above method, the ring oscillator circuit can be activated multiple times to generate a number of random bit values. According to a further embodiment of the above method, there can be a periodic switchover between the feedback paths. According to a further embodiment of the above method, a random bit value can be determined as a function of the curve of the random signal.

BRIEF DESCRIPTION OF THE DRAWINGS

The invention will be explained in greater detail below with reference to the enclosed figures and on the basis of a number of exemplary embodiments. The figures show.

DETAILED DESCRIPTION

Figure 1:
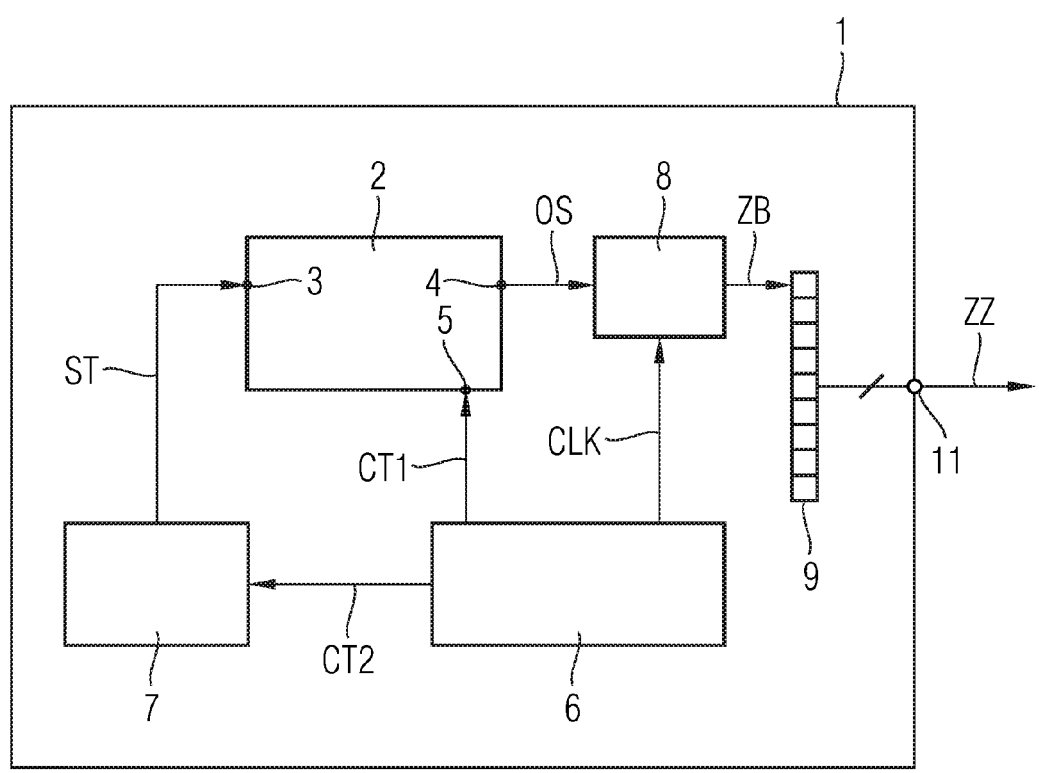
FIG. 1 an exemplary embodiment of a random number generator.

Accordingly a device for generating a random bit sequence features a digital ring oscillator circuit with at least one first feedback path and a second feedback path. In this device there is a switchover between the feedback paths at predetermined points in time and a random signal having a random level history can be tapped at an output node of the ring oscillator circuit.

With digital ring oscillator circuits an odd number of logical gates are generally fed back. This means that the output of one of the logical gates is linked to the input of another logical gate. This enables oscillations to occur which under specific conditions assume unpredictable signal forms, i.e. represent random signals. There is now provision for providing a number of possible feedback paths between which switchover can be performed. This allows an improved random signal property of the random signal to be achieved. The switchover, which produces changed oscillation properties of the ring oscillator, enables random bits to be generated without any great effort.

Thermal or quantum-mechanical processes within the semiconductor components used for implementing the oscillator cause phase fluctuations or jitter to occur, which gives rise to random internal signal curves or potential curves. The logical components, for example an odd number of inverter circuits, can be coupled for example in the form of a cascade into a ring for embodying a ring oscillator. As a rule the underlying oscillation frequency depends on the number of inverter or logic circuits to be used. Different occurrences of delays during the signal processing by the individual logical components mean that as a rule a constant phase does not occur but rather a jitter, so that frequently irregular signal forms arise.

However it cannot basically be assumed that even for long periods an absolutely random "oscillation curve" will always be present. Each ring oscillator circuit, after it is activated or started, has in its signal curve random temporal signal curves which in principle in any event, even after a synchronization process, can turn into a deterministic curve.

However the switching over of the feedback paths prevents the synchronization in a fixed point for example. For example of the respective feedback of the ring oscillator circuit can be changed under clock control or periodically. Even if the basic concept of the respective ring oscillator tends towards periodic oscillation and this thus initially appears unsuitable for generating random signals, the result of the switchover is that these types of potential periodic oscillations will be disturbed. This always causes the onset of a non-periodic random oscillation behavior from which a great entropy for further generation of random bit values can be obtained. It is also possible in such cases to use shorter Fibonacci or Galois ring oscillators, which reduces the hardware and implementation outlay. A switchover is undertaken for example such that a switch is made between at least two different Galois or Fibonacci feedbacks respectively.

The device for generating a random bit sequence thus especially has the advantage of being easy to implement and of calculations such as are necessary for example in the prior art for excluding a fixed point not having to be executed. A larger class of oscillators can thus be considered as ring oscillator circuits. In addition ring oscillators which are in one or the other operating state which is dependent on the feedback set have the advantage that, even on reaching the fixed point, which in the proposed device for generating a random bit sequence is not detrimental to the quality of the randomness, the energy consumption falls sharply. This applies especially to an implementation of the corresponding circuit arrangements in CMOS technology.

The switchover between feedback paths makes it possible to use just a few serially-connected logical components. An additional energy saving is achieved in this way. Only one circuit device is additionally provided in one exemplary embodiment for example, which performs a switchover of the feedback path at predetermined times. This can be done for example as a function of a switching signal. The switching signal preferably corresponds to a clock, through which a switchover between the feedback paths is undertaken periodically.

The especially low-outlay implementation, which for example exclusively features digital components, means that a realization as a type of FPGA circuit is especially useful. FPGA circuits are to be understood as programmable integrated circuits in digital technology. FPGAs can be field-programmed by a configuration of internal structures which can form logical gates (FPGA=Field Programmable Gate Array). Naturally the corresponding device for generating random numbers can also be embodied as an ASIC (Application Specific Integrated Circuit), for example in CMOS. The improved device compared to the usual circuit arrangements for generating random signals can also be constructed from discrete components, if for example an older random bit generator already being used is to be replaced or converted in order to increase the randomness of the generated signal.

In a form of embodiment of the device a buffer element coupled to the output node is provided, which stores a logical level as a function of the random signal.

It is possible for example to embody a buffer element as a flip-flop which, on passing through a predetermined logical threshold value, changes its internally stored state. Known flip-flops switch the internally stored logical state for example at each rising or falling signal flank of the coupled-in random signal. This means that, provided the random signal fluctuates irregularly between two logical levels, the buffer element delivers a random bit value which depends on an indeterminate number of rising or falling flanks of the random signal. For example the buffer element can store a logical level corresponding to the random signal.

It is conceivable in this case for the buffer element, such as a flip-flop for example, to store a logical level corresponding to the random signal as a function of a sampling signal. A sampling signal, for example an external clock signal, leads to the level of the random signal being detected by the buffer element at specific times and either being used as a random bit or also causing an inversion of the stored logical level in the buffer element. The switching signal for switching between the feedback paths can preferably have a higher frequency than the sampling signal. However it is also just as conceivable for the start signal, the switchover signal and the sampling signal to have the same frequency and to be synchronous or offset in time in relation to one another. The latter arrangement has the advantage that different signal generation devices are not necessary for the signals.

A corresponding start signal for restarting the ring oscillator can be delivered for example by a square wave signal generation device which generates a start signal with changing logical levels. To this end the ring oscillator circuit used is regularly restarted and exhibits a random synchronization behavior.

In an embodiment of the device a control device is provided, which in accordance with programming for example, causes a random bit value to be tapped off at the output node or buffer element and/or the generation of a start signal and/or a switchover signal.

The generation of a random bit sequence can especially be undertaken by inversion of a flip-flop connected to the output node at each 0-1 passage of the random signal, with the random bit also being determinable by periodic sampling of the buffered logical level of this flip-flop.

According to other embodiments, a provision can be made for a use of a digital ring oscillator circuit with at least one first feedback path and one second feedback path. In this case a respective feedback path is switched over at predetermined times and a random signal is able to be tapped at an output node of the ring oscillator with a random level history. This serves to generate at least one random bit.

According to further embodiments, a random number generator with a previously-described device for generating a random sequence is proposed. This can be employed in an RFID chip for example. The chip then features a device for generating a random bit sequence and a cryptography device, with a number of the random bits derived from the random signal being used by the cryptography device for carrying out a cryptographic authentication, for creating a cryptographic signature and/or for creating a cryptographic key.

According to yet further embodiments, a method for generating a random bit sequence is proposed in which random bit values are determined as a function of a level history of a random signal tapped at a digital ring oscillator circuit, with the digital ring oscillator circuit used having at least one first feedback path and one second feedback path. At predetermined times there is a switchover between the feedback paths. In this case a random signal with a random level history is able to be tapped at an output node of the ring oscillator circuit.

In a variant of the method the following method steps are carried out in this case: Activating a digital ring oscillator circuit, switching over between the first and the second feedback path and tapping one or more level values of an oscillating random signal generated by the ring oscillator circuit.

The corresponding method can be implemented for example by suitable programming of programmable digital logic circuits, such as FPGAs for example. The ring oscillator circuit can be activated for example by switching on or connecting a suitable supply voltage to the corresponding circuit arrangement. Activation is also possible in accordance with a respective implementation of the ring oscillator circuit by connecting a suitable control signal or start signal. Activation is to be understood as a process which results in an oscillation of the ring oscillator circuit, preferably starting from a predetermined start state of the logic gate employed.

In this case the ring oscillator circuit can be activated multiple times to generate a number of random bit values. The proposed method steps can be carried out independently of one another in time in this case. The switchover processes between the feedback paths in particular promote the randomization in the level history in this case.

As has already been explained in relation to the device for generating a random bit sequence, the random signal can be sampled a number of times and a logical level of a random bit can be changed as a function of a respective level value of the random signal. This can be achieved for example by a buffer element, as has already been described.

In the figures elements which are identical or elements having identical functions have been labeled with the same reference signs unless specified otherwise.

An example of a random number generator 1 is shown in FIG. 1. The random number generator 1 features a ring oscillator circuit 2 with an input node 3 and an output node 4. Exemplary embodiments for ring oscillators are explained in greater detail for example in the subsequent FIGS. 2, 4 and 6.

A ring oscillator can typically be realized by cascaded connection of a number of inverters. Inverters or also other logical components are used in such cases as delay elements, with variations of the individual delay times giving rise to non-predictable oscillation variations, known as jitter. The delay fluctuations are based as a rule on different internal and external noise factors such as for example the hardware implementation of the components and current, voltage and/or temperature fluctuations. Provided, as is the case with inverters or logical gates, the delay time is extremely short, the unpredictable fluctuations deliver random level curves of the basically oscillating signal which is able to be tapped at the output node 4 of the random signal OS.

The ring oscillator 2 also has a connection 5 for a switchover signal CT1. Internally the ring oscillator circuit, as already indicated above, has logical components connected serially or cascaded, which however are able to be fed back via at least two different feedback paths. The feedback path is changed in ring oscillator 2 as a function of the switchover signal CT1. This creates an additional randomization since, on changing the respective feedback path, the signal curves occurring are disturbed.

The ring oscillator circuit 2 can be activated or started respectively by a suitable start signal ST which is connected to the input node 3. It is possible in principle for the ring oscillator circuit 2, as a result of its internal structure, to have a fixed point, meaning that stable states exist in which the logical components exhibit logical states which no longer change over time. Until such a fixed point is reached however a practically random change to the corresponding level able to be tapped occurs. In addition the switching over and thereby changing of the circuit topology of the ring oscillator 2 generally prevents any stable state at all arising within the ring oscillator.

The random signal OS is supplied to a buffer element 8, a flip-flop device for example. The flip-flop device 8, for example a D flip-flop, accepts the random signal at a data input and delivers at a data output a buffered logical level as random bit ZB. Since the random signal OS fluctuates over time and varies at random it is conceivable for example that, by connecting a sampling signal, for example in the form of a clock signal CLK, to a clock input of the flip-flop 8, the present value of the random signal OS at the sampling time, i.e. for example when a rising or falling clock flank is present, will be detected or buffered.

A corresponding sampling or clock signal is delivered in the diagram of an example depicted in FIG. 1 by a control device 6. The control device 6 likewise generates a suitable switchover signal CT1 which is supplied to the latter's terminal 5 for switching over the feedback paths in the ring oscillator circuit 2, and a control signal CT2 to control a square wave signal generator 7 which delivers the start signal ST to the input node 3 of the ring oscillator 2.

Periodically switching over for example between the feedback paths and thus the inherent oscillation properties of the ring oscillator circuit 2 means that potential fixed points present are not critical for the random number generation or random bit generation respectively. By providing a number of coupling options or paths respectively and switching over between them, as a rule only the synchronization behavior which does not occur deterministically is taken into account on tapping of the random signal OS. To this extent any conventional ring oscillator is suitable for use as a ring oscillator circuit which is modified in that a number of alternate feedback paths are provided between which switching is possible.

Different execution operating modes of the random generator 1 are conceivable. For example, as has already been described, the random signal OS can be detected at each sampling point by the buffer element 8 and output as a random bit ZB. This is inserted into a shift register 9 for example. After a predetermined number of sampling points a random bit sequence is thus present in the shift register 9. As an alternative, even if not explicitly shown in FIG. 1, the shift register can also be controlled by the clock signal CLK. At an output 11 of the random number generator 1 a binary-coded random number ZZ can then be tapped, of which the binary digits can be read out in a clocked manner for example.

As an alternative the buffer element or flip-flop 8 can also be designed such that, for each 0-1 passage or also each 1-0 passage of the random signal OS, the internally stored value of the random bit ZB is changed in the buffer element 8. Thus the number of fluctuations or oscillations of the random signal OS is used as an additional random element to generate a random bit. Depending on the sampling or clock signal CLK the level state generated at random in the buffer element 8 is then output as the random bit ZB.

It is further conceivable, before each random bit generation, to reset the ring oscillator circuit or to restart it in order to reduce the danger of reaching a fixed point. It is preferably predetermined for the resetting or initialization of the ring oscillator circuit that the start status, i.e. the logical levels of all logical and digital components which are used in the ring oscillator circuit 2, do not correspond to those of a fixed point status.

Typical ring oscillator circuits with feedback paths that can be switched over are explained in greater detail below, which are suitable for use in a device for generating random bit sequences.

Figure 2:
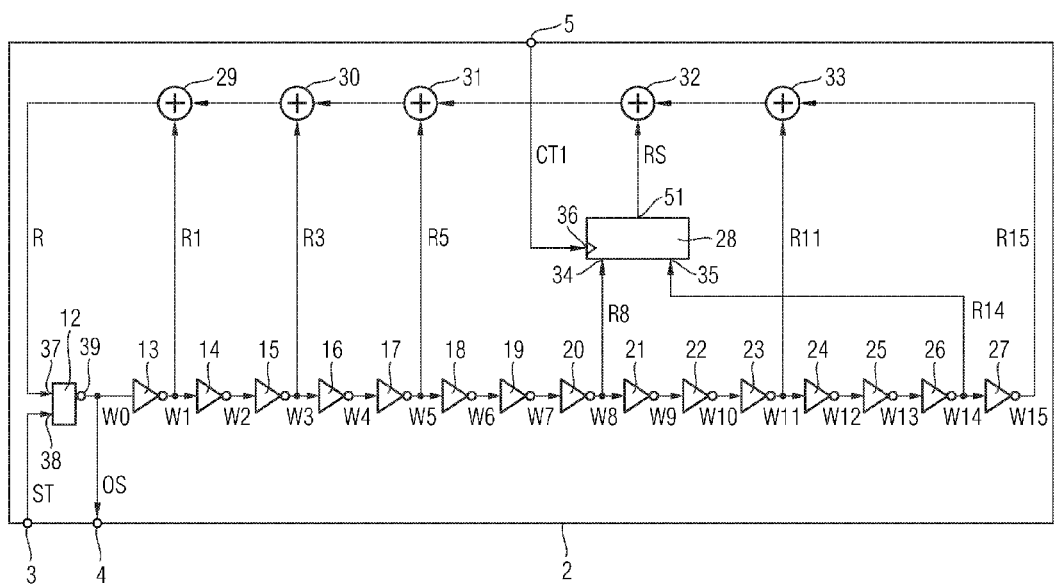
FIG. 2 a first form of embodiment of a ring oscillator circuit.

FIG. 2 shows a ring oscillator circuit featuring sixteen serially-connected logical components 12-27. In this case the zeroth logical component is embodied as a NAND gate 12 and the other logical components 13-27 as inverter stages. This arrangement is equivalent to 16 serially-arranged inverter gates. The respective output signals are designated W0-W15. The first logical component 12, i.e. the NAND gate, has two inputs 37 and 38, of which the second input 38 is connected to the input node 3 of the ring oscillator 2. A start signal ST is coupled to the input node 3. The random signal OS which is supplied to the output node 4 of the ring oscillator can be tapped at output 39 of the NAND gate 12.

The output signal W15 of the last, i.e. fifteenth inverter 27, is fed as an external feedback signal R15 to the input 37 of the NAND gate 12. As well as this external feedback path R, the respective output signals W1, W3, W5, W8, W11 and W14 are also tapped at the outputs of the first inverter 13, the third inverter 15, the eighth inverter 20, the eleventh inverter 23 and the fourteenth inverter 26 and are available as potential feedback signals R1, R3, R5, R8, R11 and R14.

The feedback signals R1, R3, R5 and R11 are added via adders 29, 30, 31, 32 to the external feedback signal R15 and thus form fixed unchangeable feedback paths. The feedback signals R8 and R14 also present can likewise be switched via a switching device 28 as feedback paths. To this end the feedback signals R8 and R14 are fed to inputs 34, 35 of a switching device 28, which, as a function of the switching signal CT1, which is available via the switching input 5 of the ring oscillator circuit 2, delivers at its output 51 a switched feedback signal RS. The switched feedback signal RS is added via an adder 32 to the external feedback path R15 which is coupled to the feedback signal R11 via the adder 33. The components represented as adders 29, 30, 31, 32, 33 correspond to logical XOR components.

The switching device 28 can for example be embodied as a multiplexer. It is thus possible to switch over via the switching device 28 between the two feedback paths R8 and R14. A switchover in the operation of the ring oscillator circuit, i.e. while an as a rule random oscillation or vibration is occurring in the signal path through the chain of logical components 12-27, causes this circuit to be disturbed, whereby a further randomization of the random signal OS, especially present at the output of the first logical component 12 is brought about. The ring oscillator shown in FIG. 2 essentially corresponds to a Fibonacci ring oscillator of length 16 which can be represented by the following feedback function:

W0=NOT{W15 XOR [(W14 AND CT2) OR (W8 AND NOT CT2)] XOR W3 XOR W11 XOR W5 XOR W11 XOR W1}, with Wi+1=NOT Wi.

A practically completely random behavior is imparted to the random signal OS by this.

Figure 3:
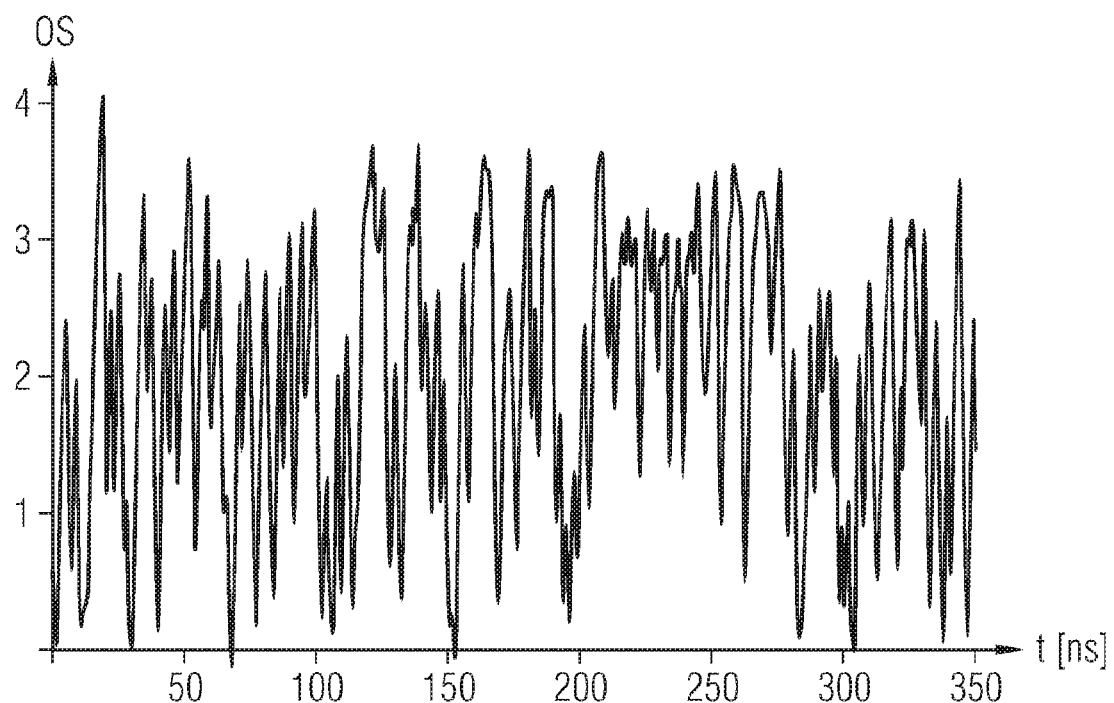
FIG. 3 a curve of a random signal of the first form of embodiment of a ring oscillator circuit.

FIG. 3 shows an example of the signal curve of the random signal OS for a ring oscillator implemented as an FPGA in accordance with FIG. 2. In this case it is assumed that a switchover between the two possible feedback paths R8 and R14 occurs every 10 ns. This can be implemented for example using a suitable realization of switching signal CT1. For example the switching input 36 of the multiplexer or of the switching device 28 can be furnished with a corresponding clock signal as its switching signal. The signal curve depicted in FIG. 3 is shown in ns as a function of the time t. The signal is specified as a voltage curve in any given units.

It can be seen that no periodic or deterministic signal curves are visible. By switching over between the different feedback signal paths any oscillation behavior which arises is disturbed such that, as is shown in FIG. 3, a random signal curve arises. As explained above, a respective random bit can be derived by suitable tapping or buffering of this random signal OS.

Figure 4:
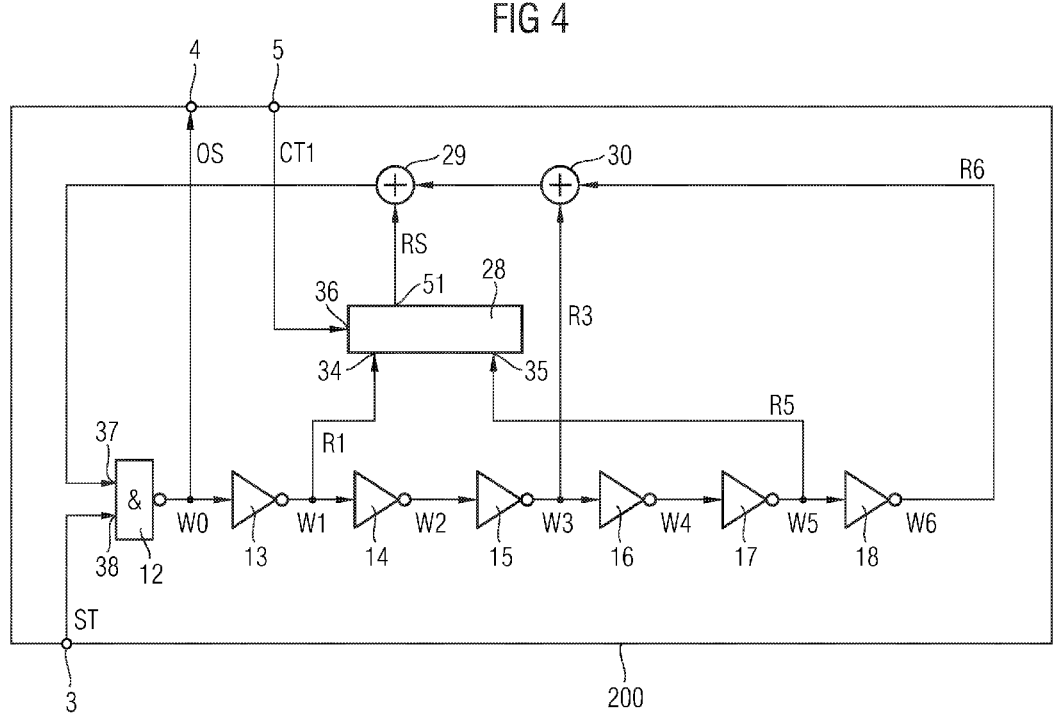
FIG. 4 a second form of embodiment of a ring oscillator circuit.

Shown in FIG. 4 is a second form of embodiment of a ring oscillator 200. The ring oscillator 200 is likewise embodied as a Fibonacci ring oscillator, however with seven inverters. In this case the first inverter is once again embodied as a NAND gate 12, to which the six serially-switched inverters 13-18 are connected. As regards the signal designations, the labels given for FIG. 2 apply. In principle the structure of the ring oscillator 200 is similar to the ring oscillator shown in FIG. 2, in which case the same elements will not be discussed once again.

The random signal OS is able to be tapped at the output of the first inverter or NAND gate 12 respectively and supplied to the output node 4. Corresponding feedback signals R1, R3, R5 and R6 are able to be tapped at the outputs of the inverters 13, 15, 17 and 18. The last feedback signal R6 serves as the external feedback signal and is supplied to the input 37 of the NAND gate 12. In addition it is possible to switch between the feedback paths R1 and R2 using the switching device 28 so that in principle different Fibonacci ring oscillator architectures are produced. The feedback signal R3 is added in a fixed manner via an adder or an XOR gate 32 to the external feedback signal R6.

Depending on the switching signal CT1, either the feedback signal R1 or the feedback signal R5 is likewise added as a switched feedback signal RS to the external feedback signal R6 via an adder or an XOR gate 29 respectively. This once again produces two possible feedback paths, which either lead from the output of the first inverter 13 to the input 37 of the NAND gate or one feedback path which leads from the output of the fifth inverter to the input 37 of the NAND gate 12.

By switching the level of the start signal RS the ring oscillator 200 can be initiated and begins a random oscillation. Since only seven inverters or logical components respectively are provided there is principally a very high frequency of oscillation which can typically be tapped at of the output of the NAND gate as a random signal. In order to prevent stable oscillations or fixed points arising there is likewise a switchover with a relatively high frequency between the feedback paths. This can be set by setting the period or the clock or the frequency respectively of the switching signal CT1.

Figure 5:
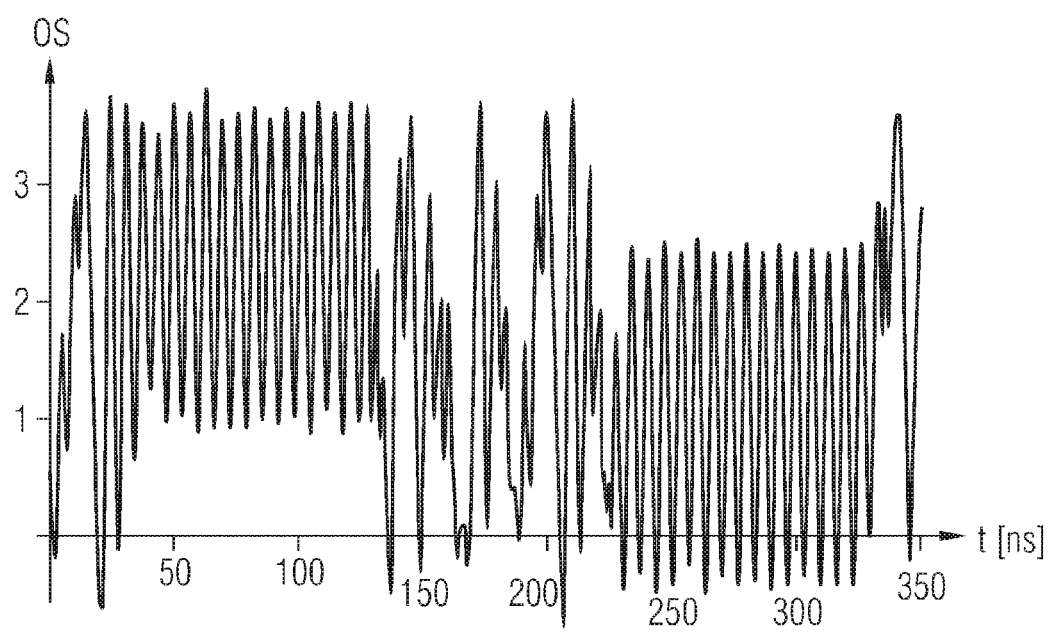
FIG. 5 a curve of a random signal of the second form of embodiment of a ring oscillator circuit.

FIG. 5 shows the signal curve similar to that of FIG. 3 for the random signal OS of the ring oscillator 200. The curve shown in FIG. 5 corresponds to the case in which there is a switchover every 100 ns between the two alternate feedback paths R1 and R3. It can be seen that for example a quasi-periodic oscillation arises in the area between 50 and 120 ns. By switching to the other respective feedback path, i.e. a change in the oscillation properties of the Fibonacci ring oscillator produced at around 125 ns, this quasi-periodic behavior is disturbed however, so that a relatively high entropy arises in the randomly produced signal curve. Through the periodic switchover for example a complex non-periodic behavior of the random signal OS is produced which, as has been described previously, is suitable for generating random bit values.

Investigations by the applicant have revealed that especially for ring oscillator circuits which provide $\geq 7$ logical components cascaded, a reliable random signal yield is made possible. Preferably however more than 10 logical components connected in series are to be provided.

Figure 6:
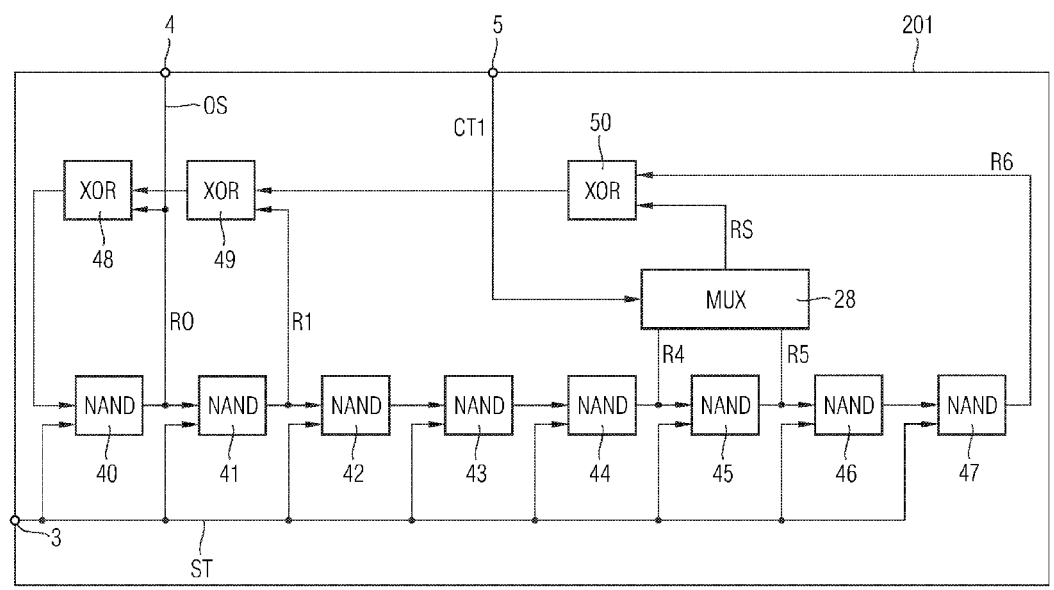
FIG. 6 a third form of embodiment of a ring oscillator circuit.

FIG. 6 shows a further example for the implementation of a ring oscillator 201. In this case eight NAND gates 40-47 are provided cascaded. The start signal ST is coupled to one of the inputs of the NAND gates 40-47 in each case. In this case the random signal OS present at the zeroth NAND gate 40 is likewise used as the internal feedback signal R0. A further feedback signal R1 at the output of the first NAND gate 41 realizes a further feedback path as well as the external feedback path which is provided by the feedback signal R6. The respective feedback signals are added together via XOR gates 48, 49.

Further two possible alternate feedback paths are provided which are produced by the signals R4, R5 present at the output of the fourth and fifth NAND gate 44, 45. As a switchable feedback signal RS which is delivered by a multiplexer 28 as a function of the switching signal CT1 a feedback through the feedback signal R4 or R5 is thus produced. Through the start signal and the use of NAND gates as logical components, the ring oscillator circuit 201 can be activated or started on a switch from 0 to 1, i.e. for a rising logical flank of the start signal ST.

Figure 7:
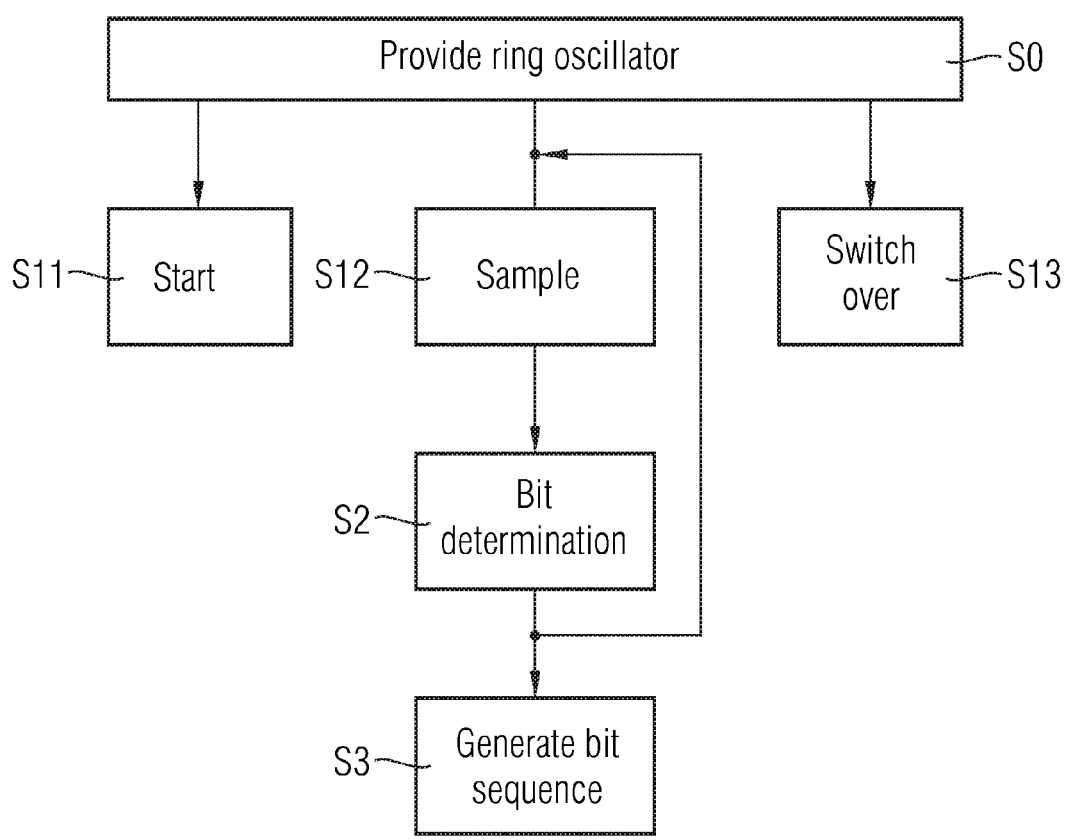
FIG. 7 a typical flow diagram of a method for generating random bit sequences.

Finally FIG. 7 shows a schematic of a typical flow diagram for a method for generating random bit sequences. As already described previously, a ring oscillator in accordance with the exemplary embodiments in the FIG. 2, 4 or 6 is especially suitable for generation of random signals. Thus in an optional preparation step S0 a corresponding ring oscillator is provided which is embodied such that it is possible to switch between a number of feedback paths.

The ring oscillator, for example that shown in FIG. 2, is started (step S11) in method steps basically executing independently of each other in time S11, S12, S13. The random signal OS is sampled (step S12) in order to derive a random bit from it, which occurs in follow-up step S2. In parallel to this in time there is a continuous switchover at predetermined times in step S13 between the potential feedback paths present.

From the specific random bits derived from random signal OS in each case, for example in step S2, a random bit sequence can subsequently be created in step S3. This random bit sequence corresponds to a binary-coded random number which is available for further applications.

As already indicated, the ring oscillator can be started, the random signal OS sampled and the switchover made between different feedback paths independently of each other in time. It is possible to perform the switchover more frequently than the random signal is sampled. As has already been shown and explained in respect of FIG. 1, a number of variants of sampling and deriving the individual random bit are possible. Basically the switchover frequency for the switchover from a first to a second feedback path should be selected such that no stable periodic oscillation is present in the intervening period. This can for example be determined by prior experiments or simulations. In principle it is to be assumed that the fewer logical components there are in the ring oscillator, the higher the necessary switchover frequency must be in order to interrupt and disturb the onset of periodic oscillations.

The invention in the form of the random number generators, ring oscillators and procedural sequences shown by way of example achieves a reliable generation of random numbers with extremely low hardware outlay. The random bit sequences or random numbers achieve a high statistical quality and can for example be employed for encryption methods or authentication algorithms, especially also on RFID chips.

What is claimed is:

1. A device for generating a random bit sequence comprising:
   a digital ring oscillator circuit, having multiple feedback paths, and being designed such that at predeterminable times a switchover occurs between the feedback paths, wherein a random signal with a random level history can be tapped at an output node of the ring oscillator circuit, and
   a control device configured to implement a series of switchovers between the feedback paths according to a selected switchover frequency.

2. The device according to claim 1, wherein the switching device switching between the feedback paths as a function of a switching signal.

3. The device according to claim 1, wherein the control device implements the switchovers periodically.

4. The device according to claim 1, wherein the ring oscillator circuit also having an input node and being designed such that an oscillation takes place when there is a change of state of a logical start signal coupled to the input node.

5. The device according to claim 1, wherein the ring oscillator circuit featuring a number of serially-connected logical components.

6. The device according to claim 5, wherein at least seven serially-connected logical components being provided.

7. The device according to claim 5, wherein the logical components being inverters.

8. The device according to claim 1, wherein the device having a buffer element coupled to the output node, which stores a logical level as a function of the random signal.

9. The device according to claim 7, wherein the buffer element storing a logical level corresponding to the random signal as a function of a sampling signal.

10. The device according to claim 9, wherein the device having a sample signal generation device which generates a change in the logical state of the sampling signal at predeterminable times.

11. The device according to claim 4, comprising a square-wave generation device coupled to the input node, which generates the start signal with changing logical levels.

12. The device according to claim 1, comprising a control device which, in accordance with programming, causes at least one of: a random bit value to be tapped at the output node or buffer element, the start signal to be generated and the switching signal to be generated.

13. The device according to claim 1, wherein the ring oscillator circuit being embodied in the form of a Galois ring oscillator or Fibonacci ring oscillator.

14. The device according to claim 1, wherein the device being implemented as an FPGA circuit.

15. An RFID chip with a device according to claim 1 and a cryptography device, wherein a number of random bits derived from the random signal being used by the cryptographic device for at least one of: for performing a cryptographic authentication, for generating a cryptographic signature, and for creating a cryptographic key.

16. A random number generator with a device according to claim 1, wherein a number of level values of the random signal tapped at the output node or logical levels stored by a buffer element being sampled as bit values or a random number.

17. A method for providing a random number, comprising:
using of a digital ring oscillator circuit with multiple feedback paths, performing a series of feedback path switchovers according to a selected switchover frequency, each feedback path switchover comprising selecting between the multiple feedback paths, and
tapping out a random signal with a random level history at an output node of the ring oscillator circuit, to generate at least one random bit.

18. A method for generating a random bit sequence, comprising:
determining random bit values based on a level history of a random signal tapped at a digital ring oscillator circuit having multiple feedback paths,
at predeterminable times defined by a selected switchover frequency, perform a series of switchovers between the feedback paths, and
tapping out a random signal with a random level history at an output node of the ring oscillator circuit.

19. The method according to claim 18, comprising:
activating a digital ring oscillator circuit;
switching between the multiple feedback path;
tapping one or more level values of an oscillating random signal generated by the ring oscillator circuit.

20. The method according to claim 18, wherein the ring oscillator circuit being activated multiple times to generate a number of random bit values.

21. The method according to claim 18, wherein the switchovers are implemented periodically.

22. The method according to claim 18, wherein a random bit value being determined as a function of the curve of the random signal.

* * * * *